Sept. 12, 1950          G. GUANELLA          2,522,369
SELECTIVE FREQUENCY TRANSLATING SYSTEM
Filed April 16, 1946
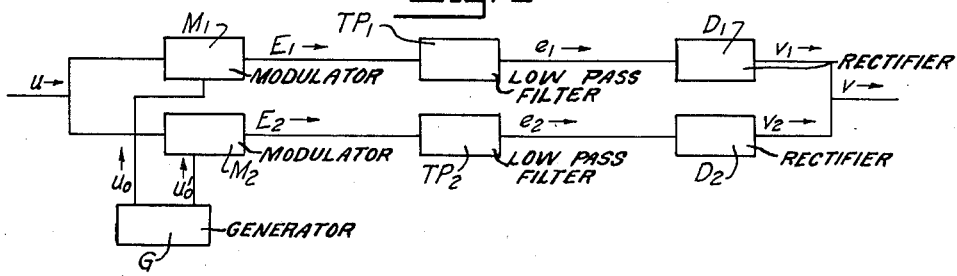
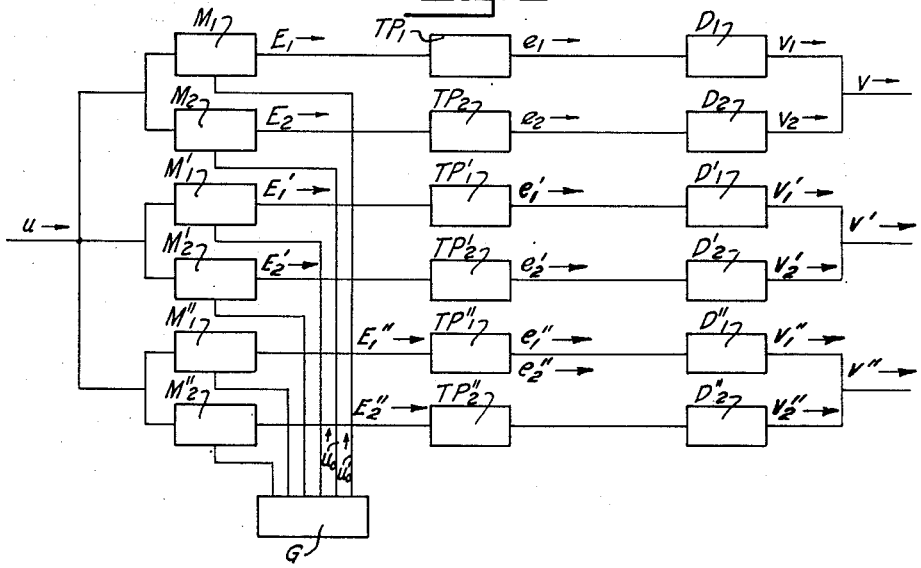
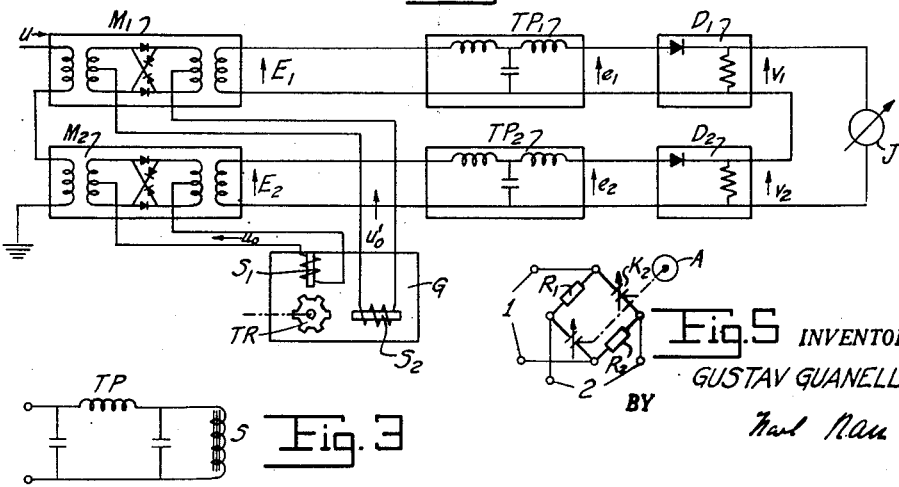
INVENTOR.
GUSTAV GUANELLA
BY
ATTORNEY Patented Sept. 12, 1950

2,522,369

UNITED STATES PATENT OFFICE 2,522,369

SELECTIVE FREQUENCY TRANSLATING SYSTEM

Gustav Guanella, Zurich, Switzerland, assignor to Radio Patents Corporation, New York, N. Y., a corporation of New York Application April 16, 1946, Serial No. 662,474
In Switzerland April 16, 1945

5 Claims. (Cl. 175—183)

The present invention relates to an arrangement for selectively translating or indicating an oscillation of given frequency, more particularly to an improved system for segregating one or more component frequencies from a given frequency mixture, such as a complex oscillation wave or a plurality of superposed carrier frequency components in a multiplex signal transmission system.

With known devices for determining the presence of certain components in a mixture of oscillations having different frequencies, the mixture is shifted in such a manner by modulation with an auxiliary oscillation having an adjustable frequency that the alternating voltage whose frequency corresponds to the sum of the frequency which is to be determined and the auxiliary oscillation frequency falls within the narrow passing range of a band pass filter which generally has a fixed adjustment. The voltage which occurs at the filter output is rectified and applied to a measuring instrument.

It has also been proposed to pass the modulation product through a low-pass filter and to translate the output oscillation of this filter whose frequency corresponds to the difference of the frequency of the oscillation which is to be determined and the auxiliary oscillation frequency. In this case, the frequency of the modulating auxiliary frequency is always so selected that it at least approximately coincides with the frequency of the oscillation component which is to be determined. The advantage of this kind of wave analysis is the fact that expensive band-pass filters with a high passing range are avoided. One difficulty, however, resides in the attainment of control values from which definite components of the oscillation mixture which is to be examined can be determined.

The present invention relates to a device for the frequency analysis of oscillation mixtures by deriving a control value from the oscillations obtained by modulating the oscillation mixture with at least one auxiliary oscillation and subsequently passing the modulation product through a low-pass filter, means being provided in accordance with the invention for at least approximately compensating the variations of the control value caused by phase differences between the auxiliary oscillation and the oscillation being determined.

The oscillation phenomena to be analysed in accordance with the invention may either be a mixture of oscillations having different frequencies or a single sinusoidal oscillation.

The invention, both as to its further objects and novel aspects, will become more apparent from the following detailed description taken in reference to the accompanying drawing forming part of this specification and wherein:

Fig. 1 is a block diagram showing the basic arrangement of a frequency translating or segregating system constructed in accordance with the principles of the invention;

Fig. 2 is a block diagram illustrating the use of a number of arrangements according to Fig. 1 for use in multiplex signal transmission;

Fig. 3 illustrates a combined low-pass filter and relay winding according to an improved feature of the invention;

Fig. 4 is a more detailed circuit diagram of the basic system according to the invention; and Fig. 5 shows a partial diagram of a variable phase shifting device suitable for use in connection with the invention.

Like reference characters identify like elements in the different views of the drawing.

The frequency analysis of an oscillation mixture $u$ according to the invention will be better understood from the following theoretical analysis.

Let it be assumed that the oscillation mixture $u$ which is to be analysed, is represented by the following equation:

$$u = n \sum_{(n)} U_n \cdot \sin(\omega_n t + \varphi_n)$$

and that the modulating auxiliary oscillation $u_0$ is represented as follows:

$$u_0 = U_0 \sin(\omega_0 t + \varphi_0)$$

If the frequency $\omega_0$ in radians per second of the auxiliary oscillation $u_0$ coincides at least approximately with the frequency $\omega_m$ of the oscillation component $u_m$ which is to be determined, the following equation will apply:

$$\omega_0 = \omega_m + \Delta\omega$$

The two oscillations $u_m$ and $u_0$ may accordingly be represented as follows:

$$u_m = U_m \sin(\omega_m t + \varphi_m)$$

$$u_0 = U_0 \sin[(\omega_m + \Delta\omega)t + \varphi_0]$$

The modulation product formed in a modulator having a square law characteristic includes the following oscillation component $$2c \cdot u_m \cdot u_0 = c \cdot U_m \cdot U_0 [\cos(\Delta\omega t + \varphi_0 - \varphi_m) - \cos(2\omega_m t + \Delta\omega t + \varphi_m + \varphi_0)]$$

From this oscillation the low-pass filter allows only the component $$c \cdot U_m \cdot U_0 \cdot \cos(\Delta\omega t + \Delta\varphi)$$

to pass. For small values of the member $\Delta\omega t$, there will be at the output of the low-pass filter a sinusoidal voltage which varies very slowly and accordingly does not produce a definite indication in the measuring instrument of the voltage $u_m$. If on the other hand, the frequency difference $\Delta\omega t$ is equal to zero, that is if the frequency of the oscillations $u_m$ coincides exactly with the auxiliary frequency $u_0$, a direct current voltage will occur having values between the voltage values $+c.U_m.U_0$ and $-c.U_m.U_0$ and corresponding to the phase difference $\Delta\varphi$. This direct current voltage also makes it impossible to determine the oscillation component of $u_m$.

By the present invention the aforementioned difficulties and drawbacks are substantially overcome in the manner explained in detail in the following.

Referring to Fig. 1, there is shown a basic arrangement of a practical embodiment of the invention. The oscillation mixture $u$ which is to be analyzed is modulated in the modulators $M_1$, $M_2$ with two auxiliary quadrature oscillations $u_0$ and $u_0'$, i. e. oscillations which differ in phase by 90° and are produced by a generator G. The modulation products $E_1$ and $E_2$, the first of which includes an oscillation $c.u_m.u_0$ and the second of which includes an oscillation $c.u_m.u_0'$, are thus formed in the modulators $M_1$, $M_2$. Low-pass filter $TP_1$ only allows component $$e_1 = c.U_m.U_0.\cos(\Delta\omega t + \Delta\varphi)$$

of the oscillation $c.u_m.u_0$ to pass, and low-pass filter $TP_2$ suppresses all oscillations except the component $$e_2 = c.U_m.U_0 \cos(\Delta\omega t + \Delta\varphi - 90°)$$
$$= c.U_m.U_0 \sin(\Delta\omega t + \Delta\varphi)$$

of the oscillation $c.u_m.u_0'$. Oscillations $e_1$, $e_2$ are applied to the rectifiers $D_1$, $D_2$ which have a square law characteristic, so that the following oscillations will be obtained from the outputs of the rectifiers:

$$v_1 = c'.(U_m.U_0)^2.\cos^2(\Delta\omega t + \Delta\varphi)$$

and $$v_2 = c'.(U_m.U_0)^2.\sin^2(\Delta\omega t + \Delta\varphi)$$

Accordingly, the sum voltage $$v = v_1 + v_2 = c'.(U_m.U_0)^2$$

represents a control magnitude for determining the oscillation components $u_m$, since it is independent of the frequency and phase differences $\Delta\omega$ and $\Delta\varphi$ prevailing between the oscillation $u_m$ on the one hand and the oscillations $u_0$, $u_0'$ on the other hand.

As an example, the arrangement shown in Fig. 1 may be used for measuring purposes by determining the individual components of a frequency mixture for determining the non-linear distortion factor of an amplifier or other device.

Another important application for the described arrangement exists in the communication and remote control fields, where different information is transmitted by a mixture of oscillations having different frequencies. In order to enable signals to be transmitted in both directions between two stations, the transmitting oscillations as well as the modulating auxiliary oscillations are produced at the transmitting and receiving end by means of similar generators. Fig. 2 shows an arrangement which may be used for signalling and constitutes a means for simultaneously determining various components of an oscillation mixture $u$ to be examined or analyzed. Three arrangements according to Fig. 1 are shown to each of which the oscillation mixture $u$ is supplied simultaneously. The various modulating auxiliary oscillations are produced by means of a common generator G. The latter may advantageously comprise a number of tone wheels having different members of teeth, whereby the required number of auxiliary oscillations may be produced in a simple manner.

When used for communication purposes, the rectifiers $D_1$, $D_2$ need not have an exactly quadratic characteristic. Rectification may even be omitted entirely, if a double relay is used which has two windings with separate core excited by the voltages $e_1$ and $e_2$, respectively. As shown in Fig. 3, the relay windings S may be simultaneously used as parts of the low-pass filters.

Fig. 4 shows an arrangement according to Fig. 1 with the individual circuit elements shown in greater detail. J is an instrument which serves to measure the sum voltage $v$. TR may be a permanent magnetic tone wheel of the auxiliary generator G, which rotates in front of the induction coils $S_1$, $S_2$ displaced in such a manner that alternating currents $u_0$, $u_0'$ with a phase displacement of 90° are generated in said coils.

In order to obtain control voltages which clearly depend on the components of a mixture of oscillations of different frequencies, it is also possible in accordance with the invention to use only one modulating auxiliary frequency and to subject the latter to a frequency wobble. It is advantageous to select the conditions in such a manner that the width of the passing range of the low-pass filter corresponds at least approximately to the frequency variation range or swing of the auxiliary oscillation, so that at least frequencies of the modulation product which are smaller than the frequency variation range of the auxiliary oscillation are indicated by the measuring instrument. Furthermore conditions should be such that the duration of a wobbling period is small compared with the time constant of the instrument for indicating the control voltage, so that the indication is free from fluctuations. As an example, an auxiliary generator comprising tone wheels of irregular tooth pitch may serve for producing the frequency-wobbled auxiliary frequencies. Vacuum tube generators may, however, also be used which are equipped with an additional tuning element, such as a variable condenser the adjusting element of which is connected to a suitable driving mechanism.

The modulating auxiliary oscillation may also be wobbled in phase instead of in frequency, or the phase of the complete oscillation mixture to be analyzed may also be wobbled. For wobbling the phase an arrangement such as is shown in Fig. 5 may be used. In the latter, reference numeral 1 indicates the input terminals and 2 are the output terminals of the arrangement. $R_1$, $R_2$ are two resistances and $K_1$, $K_2$ two variable condensers whose control elements are connected to a driving mechanism A.

I claim:

1. A system of the character described comprising a pair of modulators with means for applying thereto components of oscillation energy of a given frequency to be translated, further means for applying to said modulators quadrature auxiliary oscillation components having a frequency approximately coinciding with the frequency of the energy to be translated, low-pass filter means connected to the output of each of said modulators, rectifying means connected to each of said low-pass filter means, and means for combining the output energies of said rectifying means in like polarity relation and for translating the resultant combined energy.

2. A system for segregating a desired component frequency oscillation from a given oscillation mixture comprising a plurality of different frequency components, comprising a pair of modulators with means for applying thereto energies derived from said oscillation mixture, further means for applying to said modulators quadrature auxiliary oscillation components having a frequency approximately coinciding with the frequency of the component to be segregated from said mixture, low-pass filter means connected to the output of each of said modulators, transmission means having substantially square law characteristics connected to each of said filter means, and means for additively combining the output energies of said transmission means and for translating the resultant combined energy.

3. In a system for segregating a desired component frequency oscillation from a given oscillation mixture comprising a plurality of different frequency components, a pair of modulators with means for applying thereto energies derived from said oscillation mixture, further means for applying to said modulators quadrature auxiliary oscillation components having a frequency approximately coinciding with the frequency of the component to be segregated from said oscillation mixture, low-pass filter means connected to the output of each of said modulators, rectifying means connected to each of said filter means, and means for additively combining the rectified energies in like polarity relation and for translating the resultant combined energy.

4. In a system for determining a desired component frequency oscillation contained in oscillation mixture comprising a plurality of different frequency components, a pair of modulators with means for applying thereto energies derived from said oscillation mixture, further means for applying to said modulators quadrature auxiliary oscillation components having a frequency approximately coinciding with the component of said mixture to be measured, low-pass filter means connected to the output of each of said modulators, rectifying means having substantially square law characteristics connected to each of said filter means, means for additively combining the output energies of said rectifying means, and means for indicating the resultant combined energy.

5. In a system for determining a desired frequency component in an oscillation mixture comprising a plurality of different component frequencies, a pair of modulators with means for applying thereto energies derived from said oscillation mixture, further means for applying to said modulators quadrature auxiliary oscillation components having a frequency approximately coinciding with the frequency of the component in said mixture to be measured, low-pass filter means connected to the output of each of said modulators, rectifying means having substantially square law characteristics connected to each of said filter means, means for additively combining the rectified output energies in like polarity relation, and means for indicating the combined rectified energy.

GUSTAV GUANELLA.

REFERENCES CITED

The following references are of record in the file of this patent:

UNITED STATES PATENTS

| Number | Name | Date |
|---|---|---|
| 1,695,047 | Horton | Dec. 11, 1928 |
| 1,762,160 | Curtis | June 10, 1930 |
| 1,976,481 | Castner | Oct. 9, 1934 |
| 2,020,409 | Green | Nov. 12, 1935 |
| 2,128,801 | Cooley | Aug. 30, 1938 |
| 2,239,625 | Kentner | Sept. 14, 1943 |
| 2,369,011 | Braden | Feb. 6, 1945 |
| 2,380,791 | Rosencrans | July 31, 1945 |